(No Model.)

J. F. McELROY.
HEATING APPARATUS.

No. 478,203. Patented July 5, 1892.

WITNESSES:
John W. Fisher
Grace T. Many

INVENTOR,
James F. McElroy
BY
Frederick W. Cameron
ATTORNEY.

THE NORRIS PETERS CO., PHOTO-LITHO., WASHINGTON, D. C.

UNITED STATES PATENT OFFICE.

JAMES F. McELROY, OF ALBANY, NEW YORK, ASSIGNOR TO THE CONSOLIDATED CAR HEATING COMPANY, OF SAME PLACE.

HEATING APPARATUS.

SPECIFICATION forming part of Letters Patent No. 478,203, dated July 5, 1892.

Application filed February 26, 1892. Serial No. 422,870. (No model.)

*To all whom it may concern:*

Be it known that I, JAMES F. MCELROY, a citizen of the United States, residing at the city and county of Albany, State of New York, have invented a new and useful Improvement in Heating Apparatus, of which the following is a specification.

My invention relates to improvements in apparatus particularly adapted for use in heating railway-cars; and the object of my invention is to produce a reservoir containing a substance to which heat is applied by means of live steam and which will retain said heat for some time, giving it off after the steam has been shut off from contact therewith. I accomplish this object by means of the mechanism illustrated in the accompanying drawings, in which—

Figure 1:
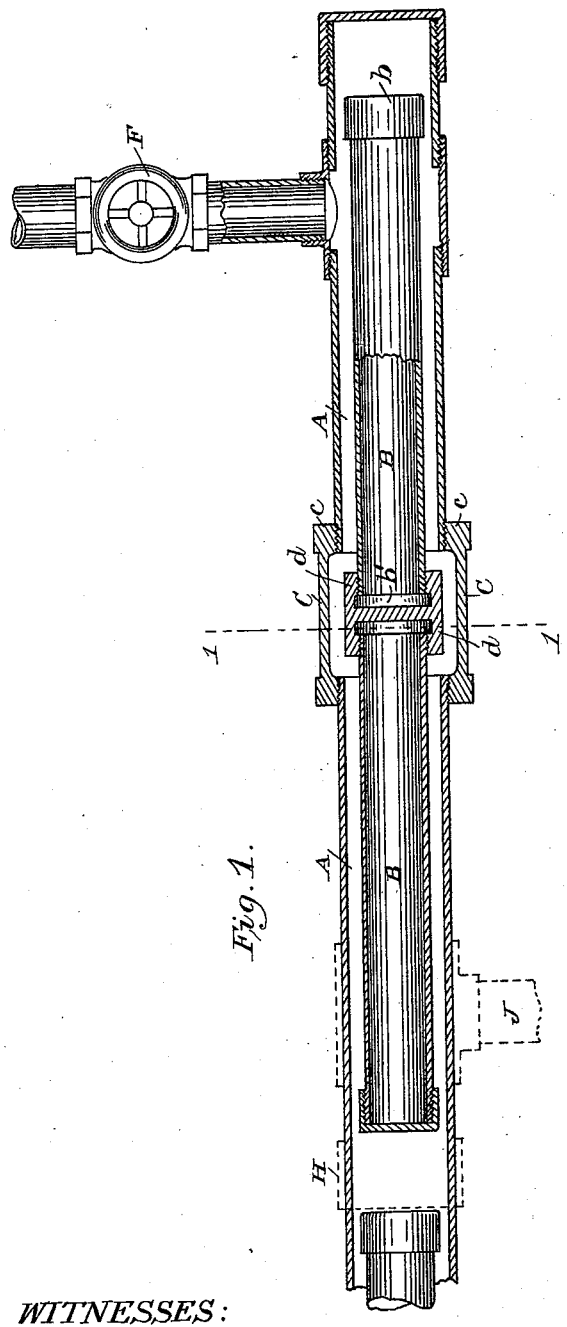
Figure 2:
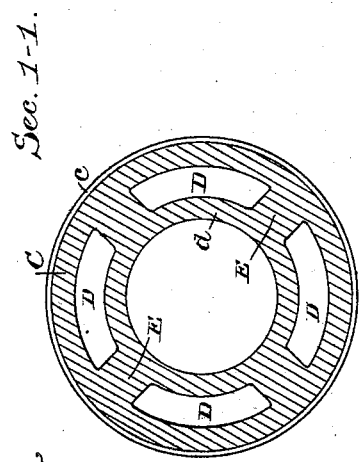

Figure 1 is a longitudinal section, and Fig. 2 is a cross-section along the lines II on Fig. 1.

Similar letters refer to similar parts throughout both views.

I arrange two pipes A and B, the one within the other, the pipe A being larger in diameter than the pipe B, the pipe B being placed within the pipe A and separated therefrom on all sides. The pipe A is secured to the coupling C by means of screw-threads on its exterior surface meshing with threads in the flange c in the coupling C. The pipe B is provided at one end with a cap b, and is secured to the coupling C by screw-threads on its exterior surface meshing with screw-threads in the flange d in the coupling C. The end of the pipe B in contact with the coupling is tightly closed.

The coupling C is constructed, as shown in Fig. 2, with spaces between the supports E, through which spaces the contents of the pipe A may freely pass. The supports E secure the portion of the coupling containing the flange c, which connects with the pipe A, with that portion of the coupling containing the flange d, connecting with the pipe B.

Within the pipe B, I place a heat-retaining substance, preferably acetate of soda, filling it not quite full of the heat-retaining substance. The end of the pipe B farthest from the coupling C is provided with a cap b, which is screwed upon the pipe B or secured thereto in any suitable manner.

Into the pipe A, I admit live steam by means of the steam-cock F, which, coming in contact with the pipe B, transmits its heat to the pipe and its contents, which retains the heat, giving it off by degrees after the live steam has been cut off. The steam-space around the inner pipe permits steam when admitted to the outer pipe to envelop the inner pipe, which will thus present its entire surface for condensation of the steam and absorption of the heat, and this heat will be rapidly absorbed by the inner pipe and the liquid within it, will very quickly be raised to nearly the temperature of the steam, and will thus absorb a large quantity of heat, which after the flow of steam is cut off will be retained for a long time and gradually radiate through the walls of both the pipes into the car or other apartment in which the heater is placed.

J represents a drip-pipe.

As thus arranged steam may be admitted at intervals into the heater and the car may be run for some distance and heat stored up in the reservoir and given out regularly thereafter, and if the heaters are used in street-cars they need be connected but a short time with a stationary steam-boiler at a convenient location along the route until the liquid-reservoirs are heated to the desired temperature, when the heat thus absorbed will last until another heating-station is arrived at.

Instead of making a continuous storage-pipe, as shown by full lines in the drawings, I may construct it in short lengths by placing a cap H upon the end of the exterior pipe A a short distance beyond the end of the pipe B, as shown by dotted lines in Fig. 1, thus making a storage-heater through which a steam-and-water connection is maintained from end to end, within which the storage-cylinders B B, made in two parts, are placed and attached rigidly to the composite coupling C, which stands in the center of the storage-heater.

I am aware that liquid-reservoirs have been used heretofore in connection with heating apparatus, but they have been constructed in such a manner as to be either inoperative or exceedingly objectionable. The end of the inner pipe has been welded to the end of the enveloping pipe in one device, which is objectionable, because it does not allow for the expansion and contraction of the interior pipe, which necessarily takes place, and which in that case soon results in breaking the connection and rendering inoperative the device. In another case the expansion of the interior pipe is provided for by constructing two pipes entirely independent of each other, placing the one loosely within the other, which is extremely objectionable, because the interior pipe moves about, makes a great noise, and damages the enveloping pipe.

By my apparatus the interior pipe is held securely in position, the expansion and contraction may take place without doing any damage, and there is no noise or other disturbance which can result to interfere with the positive and satisfactory performance of its functions.

Steam is admitted into the exterior pipe through the connection F, and a series of heaters arranged in this manner may be placed within a car, their lengths and number depending upon the requirements of the apartment.

My invention is extremely simple in its construction and operation and there is absolutely no way in which it can get out of order, and the objections heretofore existing in the use of storage-reservoirs in heating apparatus are entirely eliminated.

What I claim as my invention, and desire to secure by Letters Patent, is—

1. In a heater, the combination of two pipes differing in diameter, the smaller pipe placed within the larger, and a steam-space surrounding the smaller pipe, the smaller pipe charged with a heat-absorbing substance, one end of said smaller pipe secured in and supported by a suitable coupling, the larger pipe adapted to receive steam or other heating fluid, substantially as described, and for the purpose set forth.

2. In a heater, a coupling-head, two pipes differing in diameter attached to said coupling-head, the smaller pipe extending from the coupling-head within the larger pipe, the end of the smaller pipe farthest from the coupling-head provided with a cap, and a steam-space surrounding said smaller pipe, said smaller pipe charged with a heat-absorbing substance, said larger pipe adapted to receive steam or other heating fluid, substantially as described, and for the purpose set forth.

3. In a storage-heater, the combination of a composite coupling, two storage-cylinders rigidly attached to said coupling, an enveloping pipe surrounding said storage-cylinders, said storage-cylinders containing a heat-retaining substance, and a means for maintaining a steam-and-water connection from one end of the heater to the other, substantially as described, and for the purpose set forth.

4. In a heater, a coupling-head provided on each end near the outer edge with a projecting flange, screw-threads cut on the interior surface of said flange, said coupling-head provided at each end with a projecting flange nearer the center thereof than the aforesaid flange and suitably threaded upon the interior surface, and spaces through the coupling-head, with a pipe provided with screw-threads on its exterior surface, meshing with threads on the outer flange of the coupling-head, with a smaller pipe having screw-threads on its exterior surface, meshing with threads on the inner flange of the coupling-head, the smaller pipe charged with a suitable heat-absorbing substance, the larger pipe adapted to receive steam or other heating fluid, substantially as described, and for the purpose set forth.

JAMES F. McELROY.

Witnesses:
FREDERICK W. CAMERON,
GRACE T. MANY.